United States Patent
Nakatani et al.

(10) Patent No.: US 7,755,994 B2
(45) Date of Patent: Jul. 13, 2010

(54) OPTICAL DISC DEVICE AND HYBRID OPTICAL DISC

(75) Inventors: Morio Nakatani, Ichinomiya (JP); Masahiro Nakata, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 848 days.

(21) Appl. No.: 11/475,191

(22) Filed: Jun. 27, 2006

(65) Prior Publication Data

US 2006/0291359 A1   Dec. 28, 2006

(30) Foreign Application Priority Data

Jun. 27, 2005   (JP)   ............................. 2005-187125

(51) Int. Cl.
*G11B 7/00* (2006.01)
*G11B 7/20* (2006.01)

(52) U.S. Cl. .............. 369/53.37; 369/47.42; 369/53.22; 369/94

(58) Field of Classification Search .............. 369/47.11, 369/47.15, 47.2–47.27, 47.36, 47.38–47.39, 369/47.42, 47.55, 53.2, 53.22, 59.14, 59.23, 369/59.25–59.26, 94, 275.1–275.4
See application file for complete search history.

(56) References Cited

U.S. PATENT DOCUMENTS

| 6,320,840 | B1 * | 11/2001 | Oh et al. ........................ 369/94 |
| 6,370,102 | B1 | 4/2002 | Mons et al. |
| 2001/0008578 | A1 * | 7/2001 | Otomo et al. .................. 386/98 |
| 2003/0049017 | A1 * | 3/2003 | Chung et al. ................... 386/95 |
| 2005/0013207 | A1 * | 1/2005 | Tsumagari et al. ............. 369/14 |
| 2009/0034387 | A1 | 2/2009 | Hamasaka |

FOREIGN PATENT DOCUMENTS

| JP | 9-509776 A | 9/1997 |
| JP | 11-086338 | 3/1999 |
| JP | 2003-346348 A | 12/2003 |
| JP | 2006-155830 | 6/2006 |
| WO | WO 2006/080350 A1 | 8/2006 |

OTHER PUBLICATIONS

Japanese Notification of Reasons for Refusal, w/ English translation thereof, issued in Japanese Patent Application No. JP 2005-187125 dated on Oct. 21, 2008.
Japanese Decision of Final Rejection, w/ English translation thereof, issued in Japanese Patent Application No. JP 2005-187125 dated May 19, 2009.

\* cited by examiner

*Primary Examiner*—Andrea L Wellington
*Assistant Examiner*—Nathan A Danielsen
(74) *Attorney, Agent, or Firm*—McDermott Will & Emery LLP

(57) ABSTRACT

When it is determined that the disc loaded on a player is a hybrid next generation DVD, the DVD layer is reproduced with a red laser light. In parallel with this reproduction process, a process for notifying the presence of the HDDVD layer is performed. That is, determination is made on whether the notification timing defined in advance has been reached. If the notification timing has been reached, a control instruction is output from a controller to an AV processing circuit, and the image information including the image notifying the presence of the HDDVD layer is output from the AV processing circuit. Thus, the user may learn that the HDDVD layer can be reproduced.

1 Claim, 6 Drawing Sheets

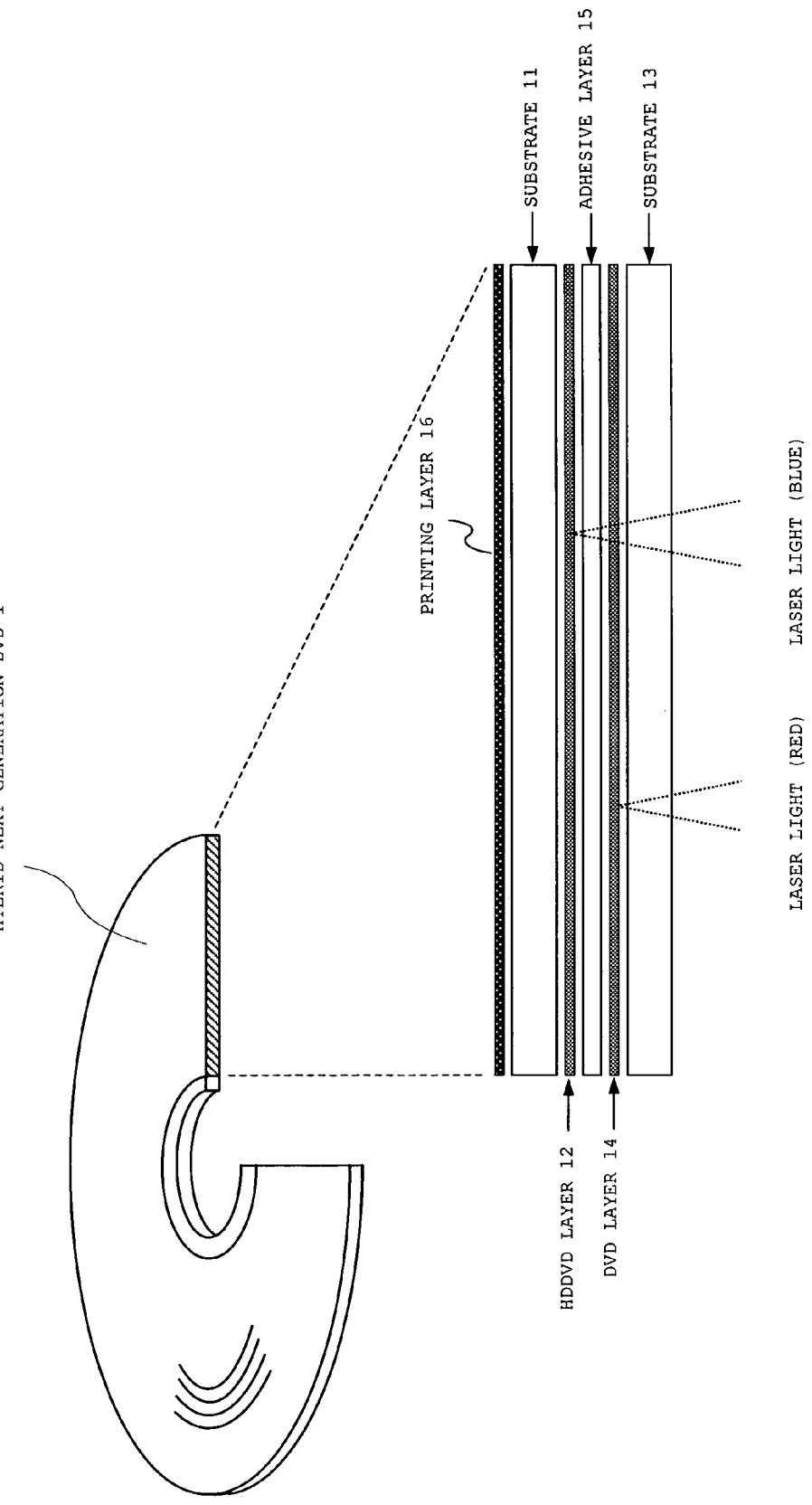

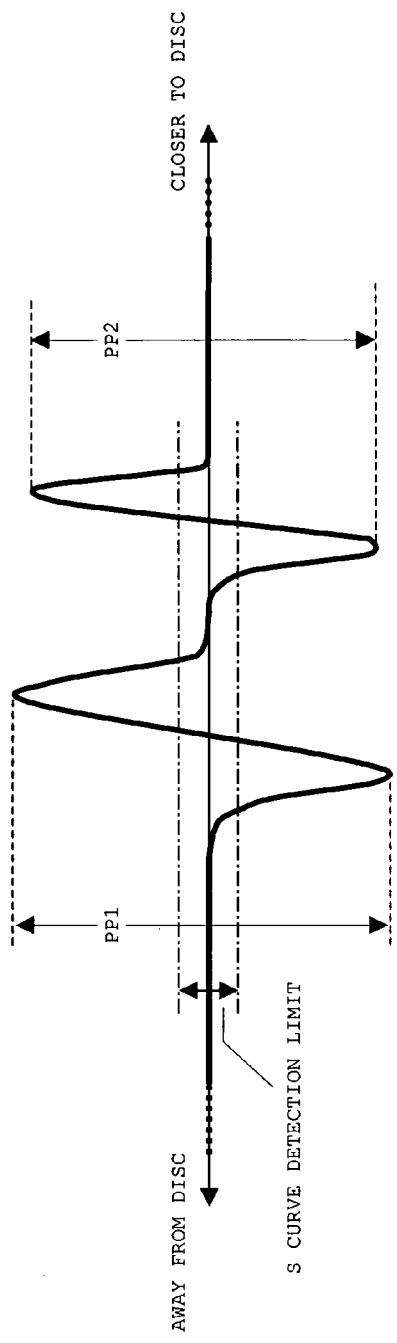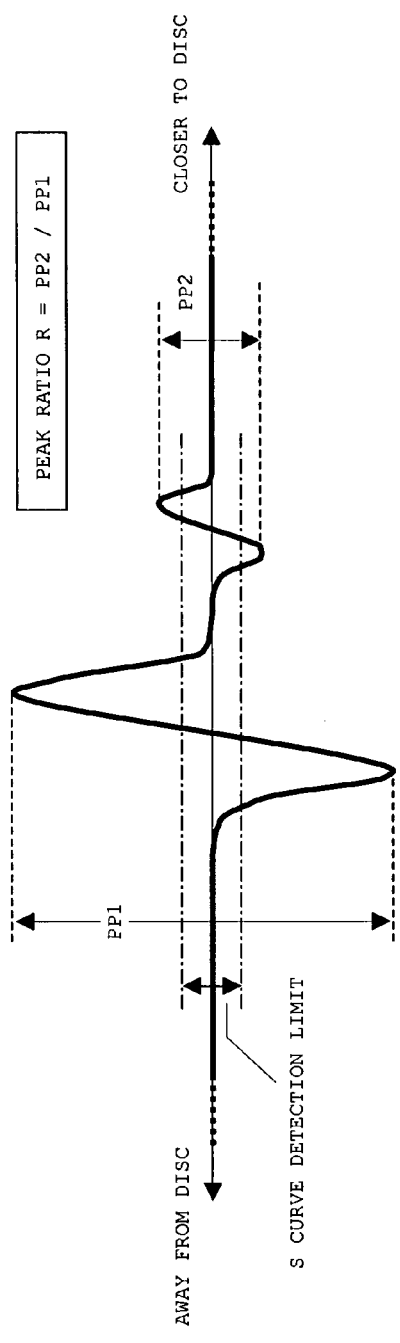

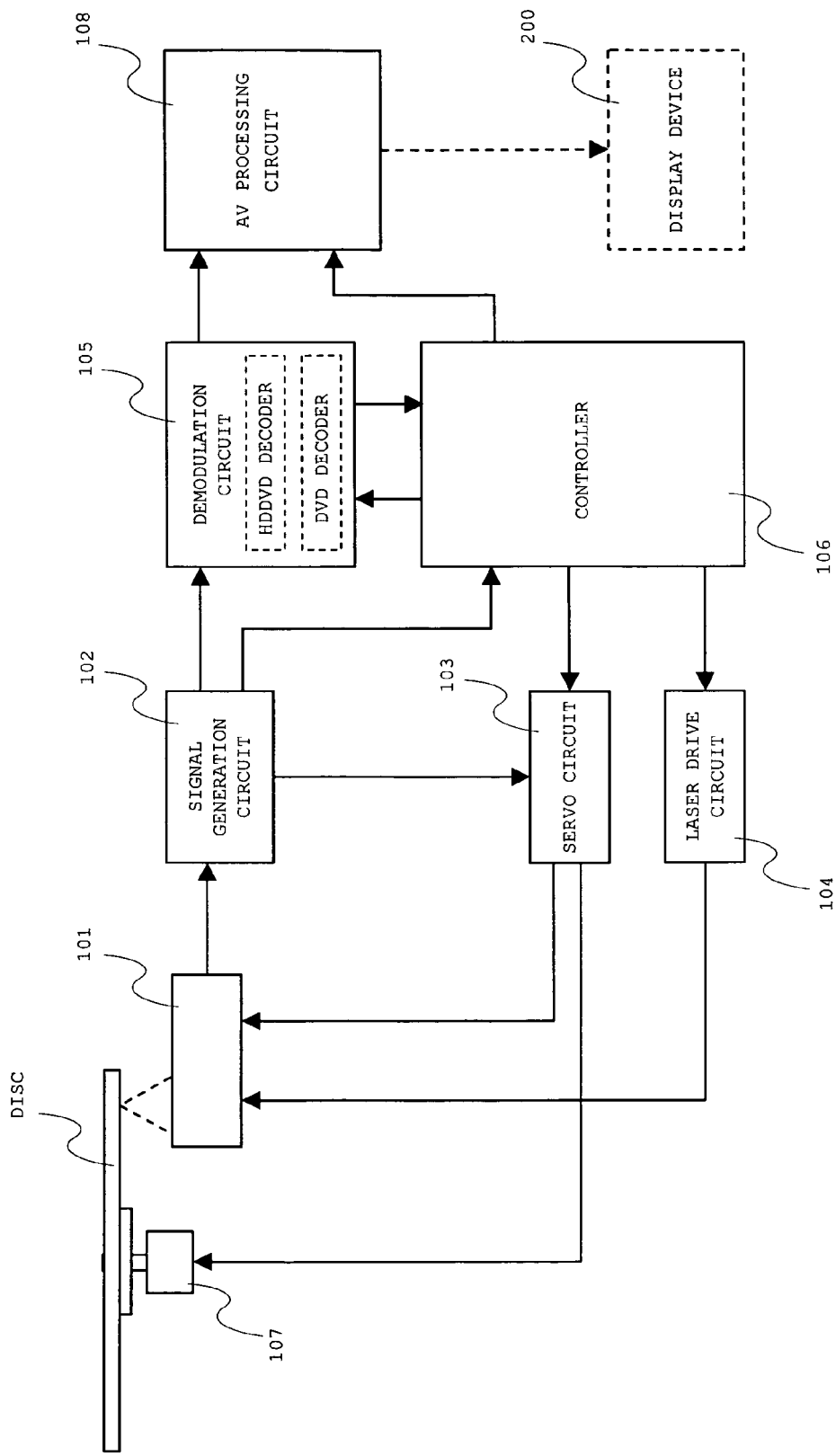

OPTICAL DISC DEVICE AND HYBRID OPTICAL DISC

This application claims priority under 35 U.S.C. §119 of Japanese Patent Application No. 2005-187125 filed Jun. 27, 2005.

BACKGROUND OF THE INVENTION

1. Field of the Invention

The present invention relates to optical disc devices and hybrid optical discs that are suitably used as, for example, a hybrid optical disc in which a recording layer corresponding to a laser light of red wavelength and a recording layer corresponding to a laser light of blue wavelength are arranged in a stacking direction, and as a driving device for the same.

2. Description of the Related Art

Presently, standardization of the next generation DVD (Digital Versatile Disc) using a blue laser light having a wavelength of about 405 nm is being forwarded. In such standardization, consideration is made on arranging two recording layers, which are the recording layer corresponding to the blue laser light (hereinafter referred to as "HDDVD layer") and the recording layer corresponding to the red laser light (hereinafter referred to as "DVD layer"), in the stacking direction.

In the next generation DVD (hereinafter referred to as "hybrid next generation DVD"), the DVD layer is positioned first when seen from the laser light entering side. The same format as that for the existing DVD is applied to the DVD layer. The information indicating that the HDDVD layer additionally exists behind the DVD layer is not held in the DVD layer. Therefore, when drawing process is performed on the DVD layer, the disc is handled as a DVD with a single recording layer.

Japanese Laid-Open Patent Publication No. 2003-346348 discloses an optical disc having two recording layers and a driving device for the same.

The driving device is normally designed to perform the drawing process on the recording layer positioned first when seen from the optical pick up side. The reproduction process is performed on the relevant recording layer if the lead-in information can be read from the recording layer. The lead-in information contains Book Type, Disc Structure, Layer Type, Track Density and the like.

When the hybrid next generation DVD is loaded on this type of driving device, reproduction on the DVD layer arranged on the optical pick up side is carried out. However, the information indicating that the HDDVD layer is present is not held in the DVD layer, as mentioned above. Thus, the reproduction process similar to that when the DVD of single layer type is loaded is performed on the driving device side. In this case, the user is not able to know the presence of the HDDVD layer. Therefore, the reproduction of the HDDVD layer may be missed although the HDDVD layer that may provide high capacity content is present.

SUMMARY OF THE INVENTION

The present invention aims to provide an optical disc device that avoids the above problems and that smoothly performs reproduction of the recording layer corresponding to the laser light of each wavelength and a hybrid optical disc.

A first aspect of the present invention relates to an optical disc device capable of reproducing an optical disc with a plurality of recording layers corresponding to a laser light of different wavelengths. The optical disc device includes: a determining means for determining whether a plurality of recording layers corresponding to the laser light of different wavelengths are arranged in a loaded disc; a notifying means for notifying to a user that the plurality of recording layers corresponding to the laser light of different wavelengths are arranged when it is determined by the determining means; and a changing means for changing a recording layer to be reproduced from a recording layer corresponding to one wavelength to a recording layer corresponding to another wavelength according to an instruction input from the user.

According to the optical disc device in the first aspect, when a plurality of recording layers corresponding to the laser light of different wavelengths are arranged in the disc loaded on the relevant optical disc device, such arrangement of the plurality of recording layers is notified to the user. The user is then able to know through notification that the disc loaded on the optical disc device is the hybrid type. The user can thus appropriately reproduce the desired recording layer without missing either recording layer.

A second aspect of the present invention relates to the optical disc device of the first aspect, wherein the notifying means displays a selection menu on a screen for selecting the recording layer corresponding to one of the wavelengths according to the determination by the determining means that the plurality of recording layers corresponding to the laser light of different wavelengths are arranged.

According to the optical disc device in the second aspect, the user can easily select a desired recording layer. Thus, the selecting operation of the recording layer is simplified.

A third aspect of the present invention relates to the optical disc device of the second aspect, wherein the optical disc device further includes a lead-in storing means for reading lead-in information from the disc loaded on the optical disc device and storing the information in a memory when displaying the selection menu.

According to the optical disc device in the second aspect, the processing sequence becomes smooth since the lead-in information is acquired using a waiting time when displaying the selection menu.

A fourth aspect of the present invention relates to the optical disc device of the first aspect, wherein the notifying means monitors whether or not notification timing defined in advance has been reached, and outputs an image and/or a sound notifying that the recording layer corresponding to another wavelength is present other than the recording layer currently being reproduced when the notification timing is reached.

A configuration of determining as the hybrid next generation DVD based on the number of S curves on a focus error signal and the peak interval thereof is given in the following embodiment as a specific example of the determining means. Further, the processes in each means are mainly executed by a controller 106 in the embodiments described below.

A fifth aspect of the present invention relates to a hybrid optical disc including: a plurality of recording layers corresponding to a laser light of different wavelengths, wherein image information is recorded on each recording layer; and image information recorded on at least one recording layer includes image information in which a main image is overlapped with an image notifying the presence of a recording layer corresponding to a different wavelength.

According to the hybrid optical disc in the fifth aspect, when one recording layer is reproduced, a notification that a recording layer corresponding to another wavelength is present is displayed overlapping the reproducing image. Thus, the user is able to know the presence of the recording layer corresponding to another wavelength, and can appropriately input an instruction to reproduce the other recording layer. In this case, a means, in particular, for determining whether the disc loaded on the optical disc device is a hybrid optical disc is not necessary on the optical disc device side. The hybrid optical disc in the fifth aspect is only reproduced normally by the optical disc device, and the presence of the recording layer corresponding to another wavelength is displayed on the screen in addition to the recording layer being reproduced.

BRIEF DESCRIPTION OF THE DRAWINGS

These and other objects, features and advantages according to the present invention may best be understood by reference to the following description of the presently preferred embodiments together with the accompanying drawings, in which:

FIG. 1 is a view showing a configuration of a hybrid next generation DVD according to an embodiment of the present invention;

FIGS. 2A and 2B are views explaining an S curve of a focus error signal according to the embodiment of the present invention;

FIG. 3 is a configuration of an optical disc device according to the embodiment of the present invention;

DETAILED DESCRIPTION OF THE PREFERRED EMBODIMENTS

Figure 4:
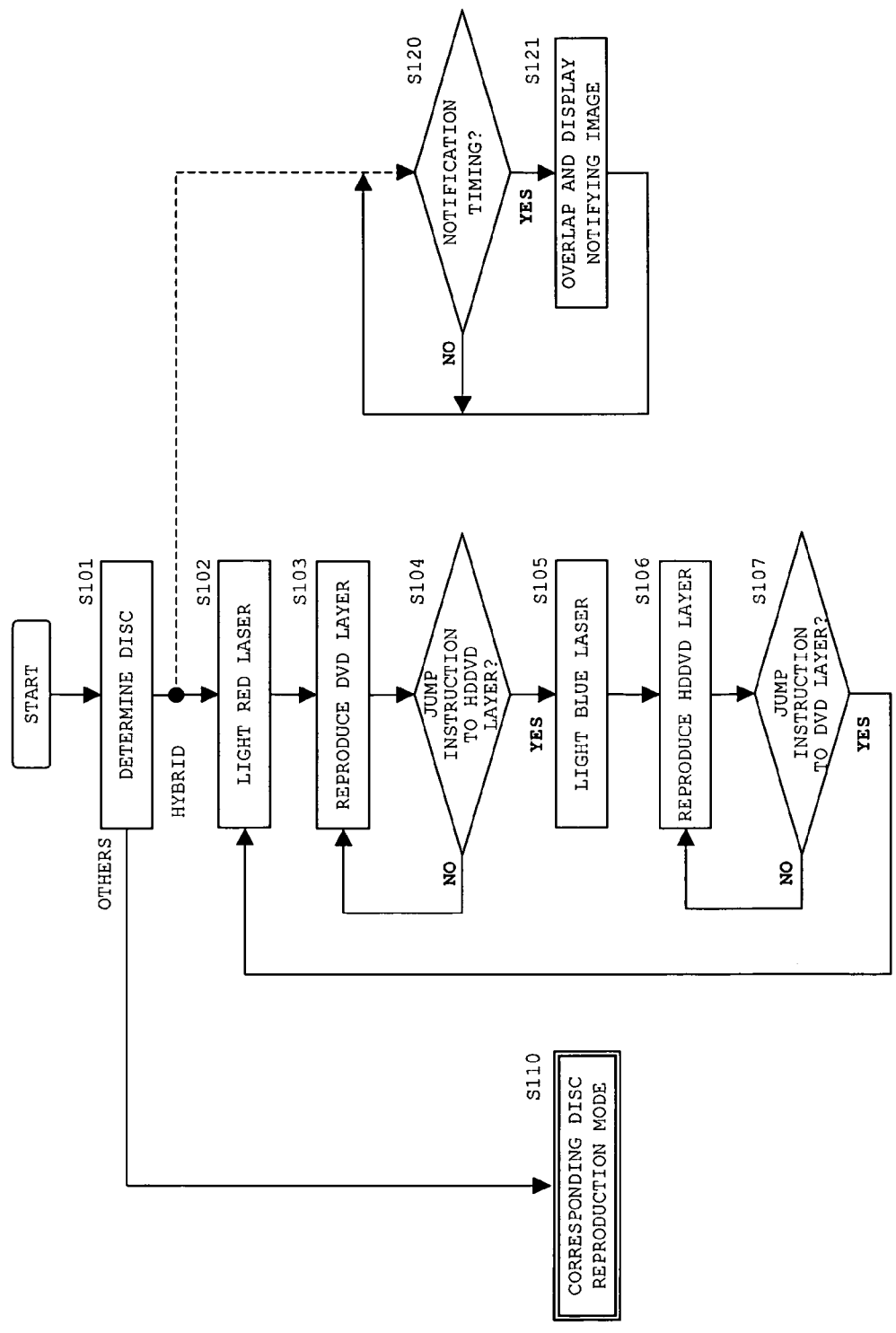
FIG. 4 is a process flowchart in disc reproduction according to the embodiment of the present invention.

The embodiments of the present invention will now be described with reference to the drawings.

In the present embodiment, an optical disc device capable of compatibly reproducing both of a next generation DVD (single layer, HDDVD layer single sided multi-layer, HDDVD layer/DVD layer single sided hybrid) and a DVD (single layer, DVD layer single sided multi-layer) is illustrated.

FIG. 1 shows a configuration of the hybrid next generation DVD.

The hybrid next generation DVD 1 has a configuration in which a substrate 11 formed with a HDDVD layer 12 on one surface and a substrate 13 formed with a DVD layer 14 on one surface are laminated by an adhesive layer 15, and a printing layer 16 is formed on the other surface of the substrate 11. A laser light enters from the substrate 13 side. Helical tracks are formed on the HDDVD layer 12 and the DVD layer 14 in the recordable type. Pits are arrayed in helical shape in the reproduction only type.

The data format of the DVD layer 14 is the same as the data format of the existing DVD. Information indicating that the HDDVD layer 12 is present is not contained in the lead-in information of the DVD layer 14. The DVD layer 14 transmits and reflects the blue laser light having a wavelength of about 405 nm and a red laser light having a wavelength of about 655 nm, respectively, at a defined ratio. Particularly, the DVD layer 14 is desirably made of a material having high reflectance for the wavelength of around 655 nm, and low reflectance for the wavelength of around 405 nm.

The data format complying with the next generation DVD standard is applied to the HDDVD layer 12. The lead-in information is also held in the HDDVD layer 12. The HDDVD layer 12 is formed by a material that reflects the blue laser light at a defined reflectance, but in which the reflectance for the red laser light is extremely low compared to that for the blue laser light.

Thus, two types of lead-in information of the lead-in information corresponding to the DVD layer and the lead-in information corresponding to the HDDVD layer are held in the hybrid next generation DVD.

The multi-layer type DVD in which two DVD layers are arranged on one surface has a configuration in which the HDDVD layer 12 is replaced by the DVD layer in the configuration of FIG. 1. In this case, the lead-in information of the DVD layer closer to the pick up contains information indicating the presence of two DVD layers.

The multi-layer type next generation DVD in which two HDDVD layers are arranged on one surface has a configuration in which the DVD layer 14 is replaced by the HDDVD layer in the configuration of FIG. 1. In this case as well, the lead-in information of the HDDVD layer closer to the pick up contains the information indicating the presence of two HDDVD layers.

In the disc with two DVD layers or the disc with two HDDVD layers, the lead-in information is only present in the layer closer to the pick up and only one type of lead-in information is prepared.

FIG. 2A is a schematic diagram of an S curve of the focus error signal of when the red laser light is irradiated on the DVD or the next generation DVD of multi-layer type having two DVD layers or two HDDVD layers on one surface and focus search is performed.

FIG. 2B is a schematic diagram of the S curve of the focus error signal of when the red laser light is irradiated on the hybrid next generation DVD and focus search is performed.

When the red laser light is irradiated on the DVD or the next generation DVD of single layer type and focus search is performed, the S curve produced by the recording layer appears on the focus error signal. In this case, the S curve produced by the substrate surface also appears in addition to the S curve produced by the recording layer. However, since the peak interval of the S curve produced by the substrate surface is sufficiently small compared to the peak interval PP2 of FIG. 2B, false detection of recognizing the S curve produced by the substrate surface as the S curve produced by the recording layer can be avoided by appropriately setting a limiting value for detecting the S curve produced by the recording layer.

As hereinafter described, the optical disc device determines the disc type based on the difference in S curves of the focus error signals and the like, drives the drive at the setting corresponding to the disc type, and acquires the lead-in information from the recording layer.

FIG. 3 shows a configuration of the optical disc device. In this figure, only the blocks associated with the reproduction system are shown.

The optical disc device includes an optical pick up 101, a signal generation circuit 102, a servo circuit 103, a laser drive circuit 104, a demodulation circuit 105, a controller 106, a spindle motor 107 and an AV processing circuit 108.

The optical pick up 101 includes a semiconductor laser for exiting the blue laser light having a wavelength of about 405 nm and a red laser light having a wavelength of about 655 nm, an objective lens for converging the laser light onto the disc, an objective lens actuator for driving the objective lens in a focusing direction and a tracking direction, a photodetector for receiving the reflected light from the disc, and an optical system for guiding each laser light exited from a semiconductor laser to the objective lens and for guiding the reflected light from the disc to the photodetector.

The signal generation circuit 102 performs calculation process on the signal from the photodetector arranged in the optical pick up 101, generates various signals such as RF signal, focus error signal, tracking error signal and the like and outputs the signals to their corresponding circuits.

The servo circuit 103 generates a focus servo signal and a tracking servo signal based on the signal input from the signal generation circuit 102, and outputs such signals to the objective lens actuator of the optical pick up 101. The servo circuit 103 also generates a motor servo signal based on the signal input from the signal generation circuit 102 and outputs such signal to the spindle motor 107.

The laser drive circuit 104 outputs a drive signal to the semiconductor laser in the optical pick up 101 based on a control signal input from the controller 106. The light emissions of the blue laser light and the red laser light are appropriately switched according to such control.

The demodulation circuit 105 demodulates the RF signal input from the signal generation circuit 102, generates the reproducing data and outputs the data to the AV processing circuit 108. The demodulation circuit 105 includes a demodulating section (HDDVD decoder) for performing data demodulation according to the next generation DVD data format and a demodulating section (DVD decoder) for performing data demodulation according to the DVD data format. Which demodulating section to use is set based on the control signal from the controller 106. Whether or not demodulatable at each demodulating section and the sub-information such as lead-in information are output from the demodulation circuit 105 to the controller 106.

The controller 106 stores various data in a built-in memory, and controls each section according to the program set in advance. The controller 106 receives the focus error signal from the signal generation circuit 102 in the disc determining process. The controller 106 then performs disc determination based on the relevant signal.

The AV processing circuit 108 processes the reproducing data input from the demodulation circuit 105, and acquires the video information and the sound information. The video information is output to a display device 200 such as television according to the control instruction from the controller 106. The sound information is output to a speaker or the like (not shown) according to the control instruction from the controller 106. Further, information for outputting a predetermined screen or sound is appropriately output from the AV processing circuit 108 according to the signal from the controller 106. The AV processing circuit 108 holds in advance the information for performing the relevant output.

FIG. 4 shows a process flowchart in disc reproduction.

When the disc is loaded on the optical disc device, the disc determining process is first performed (S101). Disc determination is performed using various methods. For instance, the information of each recording layer may actually be demodulated while switching the laser light and the demodulating section, and disc determination may be performed based on whether or not demodulatable.

In the present embodiment, disc determination is performed based on the S curve produced on the focus error signal shown in FIGS. 2A and 2B. That is, after the red laser light is lighted, focus search on the relevant disc is performed. Determination is made on whether the disc is a single layer type or a multi-layer type based on the number of S curves produced on the focus error signal. In a case of multi-layer type, the ratio (R=PP1/PP2) between the peak interval PP1 of the largest S curve and the peak interval PP2 of the second largest S curve is calculated. If the peak ratio R is greater than or equal to a threshold value, the disc is determined as the multi-layer disc in which a plurality of DVD layers or HDDVD layers are arranged. If the peak ratio R has a size greater than or equal to a certain size and is less than the threshold value, the disc is determined as the hybrid next generation DVD in which the DVD layer and the HDDVD layer are arranged.

When determined as the multi-layer disc in which a plurality of DVD layers or HDDVD layers are arranged, the recording layer positioned first when seen from the optical pick up side is read with the red laser light. The read signal is demodulated with a DVD decoding section of the demodulation circuit 105, and if demodulatable, the disc is determined as the multi-layer disc in which a plurality of DVD layers are arranged. If not demodulatable, the disc is determined as the multi-layer disc in which a plurality of HDDVD layers are arranged.

When determined as the single layer type from the number of S curves produced on the focus error signal, the relevant recording layer is read with the red laser light. The read signal is demodulated with the DVD decoding section of the demodulation circuit 105, and if demodulatable, the disc is determined as the single layer disc in which one DVD layer is arranged. If not demodulatable, the disc is determined as the single layer disc in which one HDDVD layer is arranged.

If the determination result in S101 is not the hybrid next generation DVD, reproduction is performed in a disc mode corresponding to the determination result (S110).

If the determination result in S101 is the hybrid next generation DVD, the red laser is lighted (S102), and reproduction on the DVD layer positioned first when seen from the optical pick up side is performed (S102). If the disc determination in S101 is performed using the red laser light as described above, S102 is skipped. That is, since the red laser is already lighted in the process of S101, reproduction in S103 is performed with the lighting maintained as it is.

If the determination result in S101 is the hybrid next generation DVD, the process (S120, S121) of notifying the presence of the HDDVD layer is performed in parallel with the reproduction process. That is, determination is made on whether or not the notification timing defined in advance has been reached (S120). If the notification timing has been reached (S120:Y), the control instruction is output from the controller 106 to the AV processing circuit 108, and the image information containing the image notifying the presence of the HDDVD layer is output from the AV processing circuit 108 to the display device 200. The user is then notified of the presence of the HDDVD layer. The relevant notification may be output as sound in addition to the image. The notification may also be output only as sound.

When the instruction to reproduce the HDDVD layer is input from the user (S104: Y) while reproducing the DVD layer in S103, the lighted laser is switched to the blue laser (S105), and reproduction on the HDDVD layer is performed (S106). This reproduction continues until the instruction to reproduce the DVD layer is again input from the user. When the instruction to reproduce the DVD layer is input from the user (S107: Y), the lighted laser is switched to the red laser (S102), and reproduction on the DVD layer is performed (S103). Similar processes as above are then executed.

The notification timing in S120 may be, for example, the timing of displaying the menu screen for selecting a chapter or reproducing language etc. carried out at the beginning of reproduction of the DVD layer. The notification timing may also be after reproducing the DVD layer, after the elapse of a certain time, or for every elapse of a certain time. The presence of the HDDVD layer is, however, preferably notified to the user at an early as possible stage.

In the flowchart of FIG. 4, whether or not the notification timing has been reached is monitored, and the image notifying the presence of the HDDVD layer is displayed overlapping the reproducing image when the relevant timing has been reached, but the image notifying the presence of the HDDVD layer may be contained in advance in the image information (content information) recorded on the DVD layer. For instance, the image (character etc.) for performing the notification is contained in the content information for displaying the screen at the beginning of reproduction out of the content information configuring a series of screens. In this manner, the image notifying the presence of the HDDVD layer is displayed overlapping the main image when the relevant content information is reproduced. The user is then notified of the presence of the HDDVD layer. In this case, the processes in S120, S121 of FIG. 4 do not need to be performed.

Figure 5:
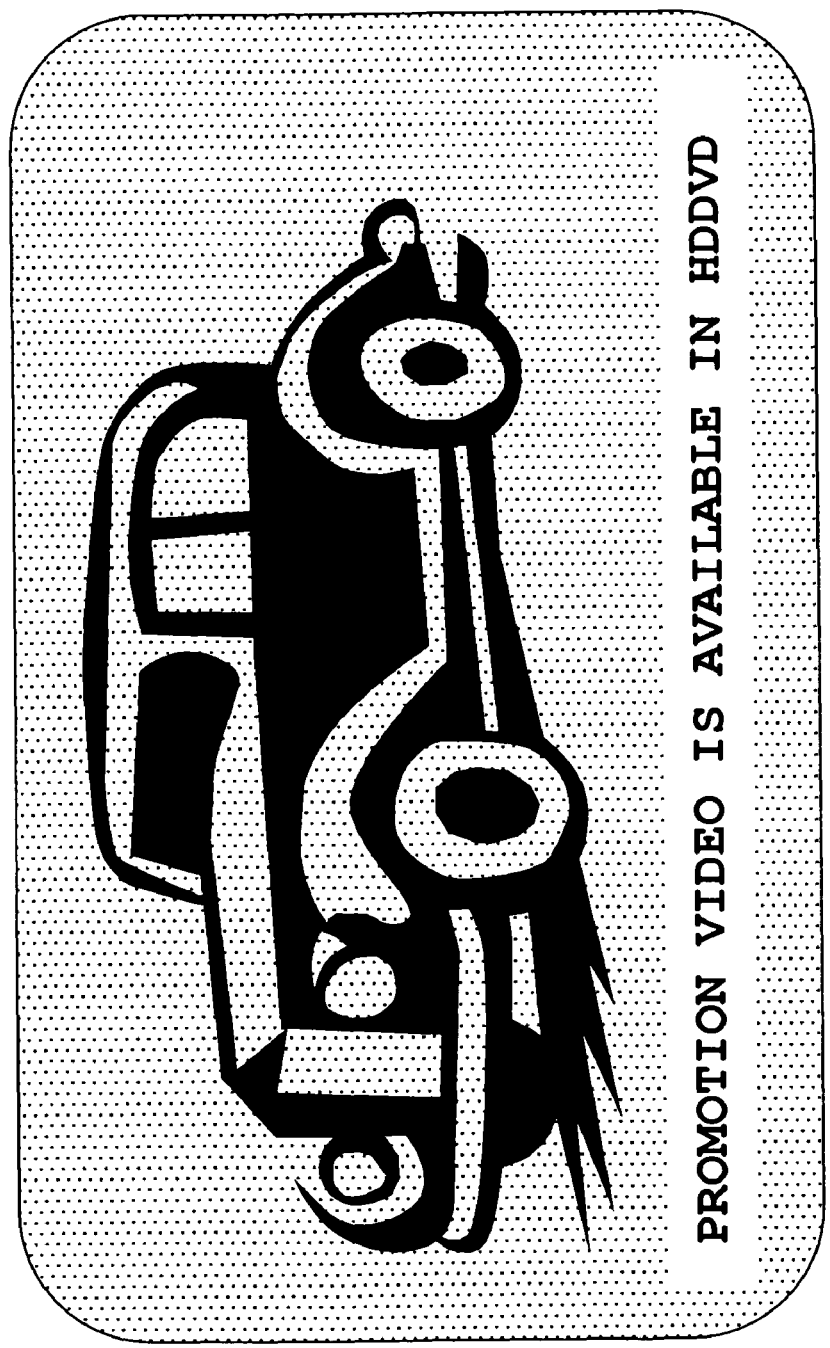
FIG. 5 is a display example in the hybrid next generation DVD reproduction according to the embodiment of the present invention.

Alternatively, if the content information of the HDDVD layer is related to the content information of the DVD layer, the image notifying the presence of the HDDVD layer may be contained in the content information of the DVD layer related to the content information of the HDDVD layer. If promotion video information of characters, vehicles or the like that appears in the content program of the DVD layer is recorded on the HDDVD layer, for instance, the image notifying the presence of the HDDVD layer may be contained in the image displaying the characters or vehicles. In this case, the image such as in FIG. 5 is displayed when reproducing the DVD layer. The user can thus switch the reproducing operation of the optical disc device from the reproduction of the DVD layer to the reproduction of the HDDVD layer, as necessary, thereby achieving a smooth and effective reproducing operation.

The DVD layer is first preferentially reproduced, and subsequently, the notification screen of the HDDVD layer is appropriately displayed in the above description. However, when determined as the hybrid next generation DVD, inquiry may be made to the user whether to select the DVD layer or the HDDVD layer prior to the reproduction of the content. The content provider may then effectively combine the high-vision picture (HDDVD) and the non-high-vision picture (DVD) to provide the content of higher quality.

Figure 6:
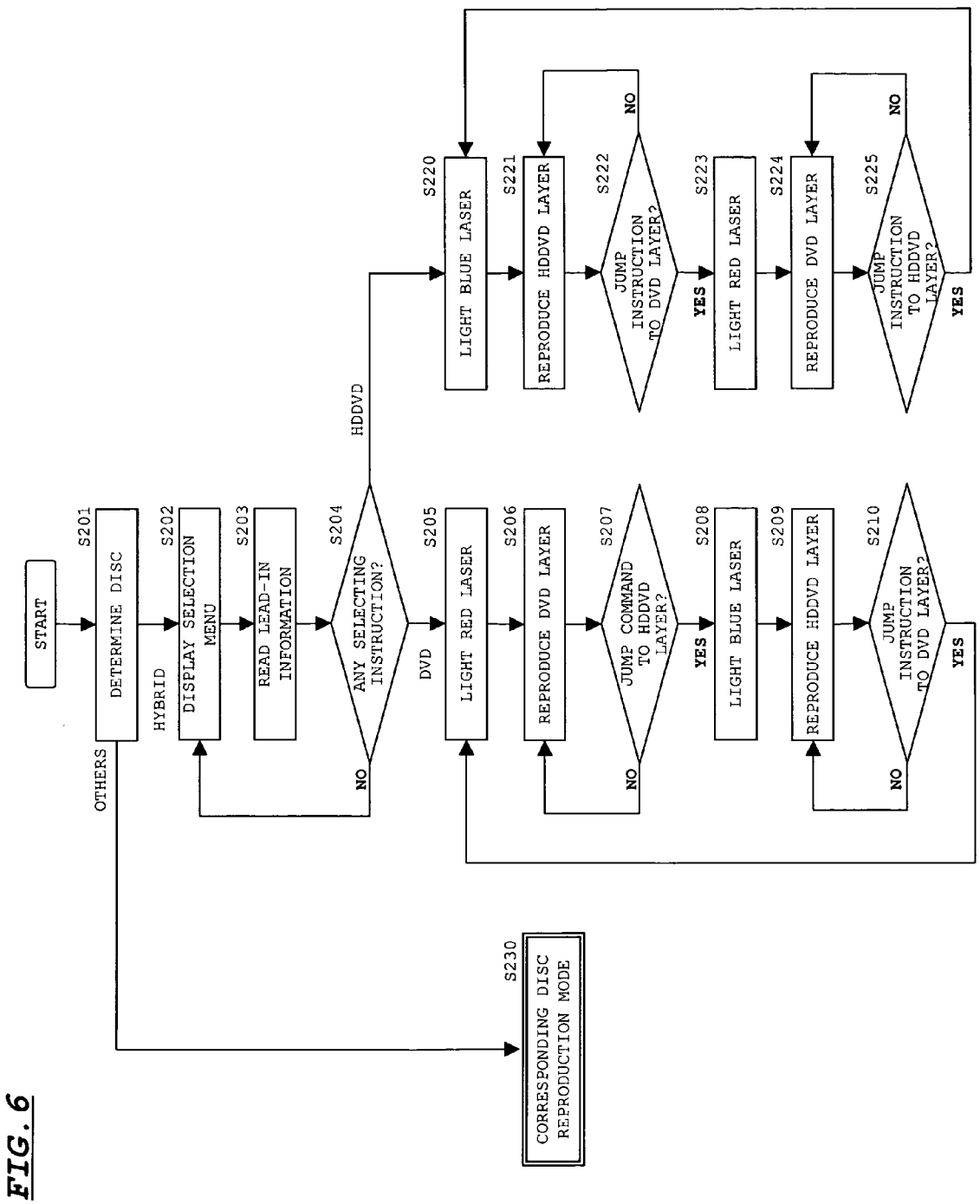
FIG. 6 is a process flowchart in disc reproduction according to another embodiment of the present invention.

FIG. 6 shows a process flowchart of such a case.

When the disc is loaded on the optical disc device, a disc determination process is performed (S201), similar to the above. If the determination result is not the hybrid next generation DVD, reproduction is performed in a disc mode corresponding to the determination result (S230). If the determination result is the hybrid next generation DVD, on the other hand, the image information (selection menu) for inquiring the user whether to reproduce the DVD layer or the HDDVD layer is output from the AV processing circuit 108 to the display device 200 (S202).

After such display, a process of acquiring the lead-in information on the DVD layer and the HDDVD layer is performed (S203) using a waiting time until the selecting instruction is made by the user. That is, the laser light of the corresponding wavelength is emitted, and the lead-in information on each layer is read. The demodulating section (HDDVD decoding section/DVD decoding section) of the demodulation circuit 105 is appropriately set to respond to the recording layer to be reproduced. The read lead-in information is then stored in the embedded memory of the controller 106.

When the DVD layer selecting instruction is input (S204: DVD) from the user after the selection menu is displayed in S202, the red laser light is lighted (S205), and reproduction of the DVD layer is performed (S206). If the instruction to reproduce the HDDVD layer is input from the user (S207: Y) at this point, the lighted laser is switched to the blue laser (S208), and reproduction on the HDDVD layer is performed (S209). This reproduction continues until the instruction to reproduce the DVD layer is again input from the user. When the instruction to reproduce the DVD layer is input from the user (S210: Y), the lighted laser is switched to the red laser (S205), and reproduction on the DVD layer is performed (S206). Similar processes as above are then executed.

When the HDDVD layer selecting instruction is input (S204: HDDVD) from the user after the selection menu is displayed in S202, the blue laser light is lighted (S220), and reproduction of the HDDVD layer is performed (S221). If the instruction to reproduce the DVD layer is input from the user (S222: Y) at this point, the lighted laser is switched to the red laser (S223), and reproduction on the DVD layer is performed (S224). The reproduction continues until the instruction to reproduce the HDDVD layer is again input from the user. When the instruction to reproduce the HDDVD layer is input from the user (S225: Y), the lighted laser is switched to the blue laser (S220), and reproduction on the HDDVD layer is performed (S221). Similar processes as above are then executed.

According to the flowchart of FIG. 6, the user is able to select the recording layer to reproduce by its own will. Thus, the degree of freedom of selection by the user is enhanced.

The processing sequence becomes more efficient since the lead-in information of each layer is acquired using the waiting time when the selection menu is displayed.

Further, by acquiring the lead-in information of each layer in advance, the seek time for switching the recording layer can be omitted since the lead-in information of the recording layer to be switched to does not need to be read while optimizing the parameter to that corresponding to the relevant recording layer when the reproducing position is switched from one recording layer to another recording layer. Therefore, the time in which the reproducing picture is stopped is shortened when switching the recording layer, and a comfortable image reproducing operation is provided to the user.

In the flowchart of FIG. 6, the image information for displaying selection menu held in the AV processing circuit 108 in advance is output to the display device in S202. In place thereof, the content menu of each recording layer may be acquired from the lead-in information of the DVD layer and the HDDVD layer, and the content menu of each recording layer may be respectively displayed on the screen, thereby providing the user the ability to select. In this manner, the user is able to select the content without taking the disc structure into consideration. However, in this case, S203 of FIG. 6 must be executed before S202. Thus, the advantage of acquiring the lead-in information using the waiting time in the selection of the recording layer, which is one advantage of the process flowchart of FIG. 6, is not obtained.

The present invention does not particularly limit the signal format applied to the recording layer and is widely applicable to the hybrid optical disc having a plurality of recording layers of different signal format. For instance, the present invention may be applied to a disc such as a Blu-ray disc in which the cover layer having a thickness of 0.1 mm is arranged on the entering side of the laser light, and the recording layer complying with the Blu-ray format is arranged behind the cover layer. In this case, for the hybrid optical disc, the recording layer of a signal format different from the Blu-ray format such as the DVD layer or the HDDVD layer is arranged further behind the recording layer complying with the Blu-ray format.

The embodiments of the present invention have been described above, but the present invention is not limited to the above embodiments and various other embodiments may be adopted. Various modifications may be appropriately made on the embodiments of the present invention without departing from the scope of the technical idea described in the appended claims.

What is claimed is:

1. An optical disc device capable of reproducing an optical disc with a plurality of recording layers corresponding to a laser light of different wavelengths, the optical disc comprising:
  a determination processing section for determining whether a plurality of recording layers corresponding to the laser light of different wavelengths are arranged in a loaded disc;
  a notifying processing section for notifying to a user that the plurality of recording layers corresponding to the laser light of different wavelengths are arranged when it is determined by the determination processing section; and
  a change processing section for changing a recording layer to be reproduced from a recording layer corresponding to one wavelength to a recording layer corresponding to another wavelength according to an instruction input from the user,
wherein
  the notifying processing section displays a selection menu on a screen for selecting the recording layer corresponding to one of the wavelengths according to the determination by the determination processing section that the plurality of recording layers corresponding to the laser light of different wavelengths are arranged, and
  the optical disc device comprising a lead-in storage processing section for reading lead-in information of the loaded disc and storing the information in a memory when displaying the selection menu.

* * * * *